(12) United States Patent
Flink et al.

(10) Patent No.: US 7,501,368 B2
(45) Date of Patent: Mar. 10, 2009

(54) GLASS COMPOSITION FOR BLUE LAMP BULBS AND USE OF A COMPOSITION FOR FORMING AN AUTOMOTIVE BULB

(75) Inventors: Simon Flink, Eindhoven (NL); Hubertina Maria Petra Ulenaers, Eindhoven (NL); Maarten Walter Steinmann, Turnhout (BE)

(73) Assignee: Koninklijke Philips Electronics N.V., Eindhoven (NL)

( * ) Notice: Subject to any disclaimer, the term of this patent is extended or adjusted under 35 U.S.C. 154(b) by 170 days.

(21) Appl. No.: 11/568,267

(22) PCT Filed: Apr. 26, 2005

(86) PCT No.: PCT/IB2005/051359

§ 371 (c)(1),
(2), (4) Date: Oct. 25, 2006

(87) PCT Pub. No.: WO2005/105686

PCT Pub. Date: Nov. 10, 2005

(65) Prior Publication Data

US 2007/0230200 A1    Oct. 4, 2007

(30) Foreign Application Priority Data

Apr. 29, 2004   (EP) .................... 04101836

(51) Int. Cl.
*C03C 3/095* (2006.01)
*C03C 3/087* (2006.01)

(52) U.S. Cl. ............................ 501/64; 501/71; 313/636

(58) Field of Classification Search ............. 501/64, 501/71; 313/363, 636
See application file for complete search history.

(56) References Cited

U.S. PATENT DOCUMENTS

| 4,980,319 | A | * | 12/1990 | Speit ........................... 501/60 |
| 5,610,107 | A | | 3/1997 | Danielson et al. |
| 5,674,791 | A | * | 10/1997 | Amundson, Jr. ............. 501/71 |
| 5,747,395 | A | * | 5/1998 | Smith et al. .................... 501/5 |
| 5,851,940 | A | * | 12/1998 | Boulos et al. ................. 501/71 |
| 6,753,280 | B2 | * | 6/2004 | Seto et al. ..................... 501/70 |
| 6,989,633 | B2 | * | 1/2006 | Kunert et al. ............... 313/636 |

FOREIGN PATENT DOCUMENTS

| DE | 10204149 C1 | | 7/2003 |
| EP | 0603933 A1 | | 6/1994 |
| EP | 1134780 A2 | | 9/2001 |
| JP | 61219740 | * | 9/1986 |
| JP | 2004250285 | * | 9/2004 |
| WO | 0246116 A1 | | 6/2002 |
| WO | 02075777 A1 | | 9/2002 |

* cited by examiner

*Primary Examiner*—Karl E Group

(57) ABSTRACT

A glass composition for use in a lamp bulb includes cobalt oxide to provide a blue colored glass. The composition has an alkali metal oxide including lithium oxide. Such composition has a glass transition temperature $T_g$ below 700° C.; e.g., below 500° C. The glass composition is used for forming, during operation, a blue light-emitting bulb for an automotive lamp.

8 Claims, 2 Drawing Sheets

GLASS COMPOSITION FOR BLUE LAMP BULBS AND USE OF A COMPOSITION FOR FORMING AN AUTOMOTIVE BULB

The invention relates firstly to a glass composition for use in a lamp bulb and including cobalt oxide to provide a blue colored glass.

Such a glass composition is known from DE-C-10204149. Said document describes an alkaline-earth alumino-silicate glass for glass bulbs, which has a $T_g$ of more than 700° C.; the glass is to be characterized as a hard glass.

For producing this type of glass, temperatures are used of approximately 1600° C., which is relatively high; glasses of this kind also need high temperatures for forming them into bulbs.

The color temperature of such lamps is of the order of 3450 K, so that the color impression approaches the color impression of a high-pressure lamp.

The present invention has for its object to provide a glass composition of the type described, but having a lower melting point and producible with the use of lower reaction temperatures.

It was surprisingly found possible to develop a glass composition of the type described which is capable of providing a blue color in combination with a low melting point, which composition, according to the invention, is characterized in that it comprises alkali metal oxide components including lithium oxide. Where in the present application the words "including" or "comprising" are present it is to be understood that such words do not exclude the presence of elements or steps other than those listed in the claims. The words "a" or "an" do not exclude the presence of a plurality of such elements or steps.

Expediently, the above glass composition comprising alkali metal oxide, including lithium oxide and cobalt oxide, has a $T_g$ (glass transition temperature) lower than 700° C.; advantageously Tg is between 500 and 700° C., and preferably Tg is lower than 500° C.

Such a glass composition according to the invention can be said to fall in the category of soft glasses. Soft glasses generally include certain amounts of alkali metal oxides such as lithium oxide, sodium oxide, and potassium oxide.

In soft glasses, the inclusion of lithium oxide is beneficial because lithium oxide lowers the melting point, viscosity, and coefficient of thermal expansion. Additionally, the chemical durability, density, and workability are improved. It is known from the literature, however, that cobalt readily assumes a hexafold co-ordination in lithium glass, which is associated with a pink color. The blue color, which is desired, is associated with the fourfold co-ordination which, when lithium is present, will not be obtained (Coloured Glasses by Woldemar A. Weyl, Society of Glass Technology, Sheffield, 1951, pages 180-181).

Surprisingly, when investigating the possibilities for producing a soft glass composition including cobalt oxide for providing a blue color, in addition to lithium oxide, which is present for the purposes discussed above, the applicant found that a glass is obtained having a brilliant blue color instead of the expected pink color, contrary to the general principle following from the cited textbook.

In an expedient embodiment, the glass composition includes the following components in the amounts indicated below. All amounts are given in per cents by weight (wt %) and add up to 100%.

| Component | Wt % |
| --- | --- |
| $SiO_2$ | 60-75 |
| $Al_2O_3$ | 0.1-7 |
| $Li_2O$ | 0.1-2.5 |
| $Na_2O$ | 5-12 |
| $K_2O$ | 2-9 |
| MgO | 0.1-3 |
| CaO | 0.1-5 |
| SrO | 0.1-10 |
| BaO | 5-15 |
| $CeO_2$ | 0.10 ± 0.02 |
| CoO | 200-800 wt ppm |

A glass composition of this type may be denoted as a barium-strontium silicate glass composition.

In view of the fact that the composition includes appreciable amounts of $Li_2O$ in combination with cobalt oxide one would expect a pink colored glass on the basis of the literature discussed above. However, upon evaluation the composition is found to be a very good blue colored glass which has a glass transition temperature which is in the range of $T_g$ generally found for glasses comprising appreciable amounts of alkali metal oxide materials. This blue colored glass can accordingly be produced at an appreciably lower temperature than was possible for the glass disclosed in the cited DE-C-10204149. Where the latter document describes a glass forming temperature of about 1600° C., a temperature of at most 1450° C. is used for forming the blue glass according to the present invention.

The applicant has no explanation for the phenomenon, but assumes that there is a synergistic effect between the components of the composition, which apparently causes the cobalt oxide to take on the fourfold co-ordination.

Preferably, the glass composition as indicated before comprises in its best mode:

| Component | Wt % |
| --- | --- |
| $SiO_2$ | 67.6 ± 0.5 |
| $Al_2O_3$ | 3.4 ± 0.2 |
| $Li_2O$ | 1.2 ± 0.1 |
| $Na_2O$ | 7.5 ± 0.3 |
| $K_2O$ | 4.9 ± 0.2 |
| MgO + CaO | 3.2 ± 0.2 |
| SrO | 3.0 ± 0.2 |
| BaO | 8.9 ± 0.2 |
| $CeO_2$ | 0.10 ± 0.02 |
| CoO | 200-400 wt ppm |

The glass composition obtained has a Tg lower than 500° C., in particular 470-480° C., preferably approximately 475° C. The linear expansion coefficient is (between 25° C. and $T_g$) $10\text{-}11 \times 10^{-6}$ $C.^{-1}$, preferably approximately $10.5 \times 10^{-6}$ $C.^{-1}$ and the glass composition has a density of $2.5\text{-}2.7 \times 10^3$ $kg/m^3$, preferably $2.6 \times 10^3$ $kg/m^3$.

The viscosity profile of the glass composition is substantially as indicated in the following table:

$10^{14.5}$ dPa·s at 455° C.

$10^{13.0}$ dPa·s at 485° C.

$10^{12.4}$ dPa·s at 500° C.

$10^{7.6}$ dPa·s at 675° C.

$10^{4.0}$ dPa·s at 1020° C.

$10^{2.0}$ dPa·s at 1490° C.

The Tg value of 475° C. of the blue glass according to the preferred embodiment described above corresponds to a viscosity of $10^{14.1}$ dPa·s.

The invention further relates to the use of a glass composition as described above for forming a bulb for an automotive lamp that emits blue light during operation. The glass composition as described above can be used in a conventional way to produce a bulb for an automotive lamp or any other article that is to have a transmission in the blue region of the light spectrum.

The invention further relates to a glass bulb for an automotive lamp comprising the glass composition as described herein.

The invention also relates to an automotive lamp emitting, during operation, blue light and including a glass bulb as indicated above. The color temperature of such a lamp, having a bulb of blue glass of a composition described herein, is >3300K.

These and other aspects of the invention will be apparent from and elucidated further with reference to the embodiment(s) described hereinafter.

The glass-making process is described in the following. A batch is prepared by weighing and mixing all oxide-type components mentioned above. The batch is fed to a conventional continuous melting tank; adjustments of the recipe can be made by adding separate ingredients to the feeding system to enhance the coloration. The melting conditions, including temperature and gas atmosphere, are adjusted to obtain stable processing conditions for melting, refining, and color stabilization.

Optionally $Na_2SO_4$ is used as a refining agent. The refining process takes place by release of oxygen from the $SO_4$ groups. In series of complex reactions, the excess gases, including $CO_2$ and $N_2$, are removed from the glass melt to avoid gas lines in the tubes formed.

The atmosphere in the furnace is oxidized by the refining process. If $Na_2SO_4$ is used as a refining agent, said agent is partly incorporated into the glass as $SO_3$; the rest is carried off in the flue gases. If $Na_2SO_4$ is used, $SO_3$ may be present in the glass composition in amounts of about 0.15 wt %.

Glass tubes are made at the end of the glass manufacturing process using the well known Danner or Vello processes; the tubes are divided into sections from which glass bulbs are formed.

In the drawing, data are given on the glass composition according to the invention and:

Some characteristics of the glass will be given below.

Figure 1:
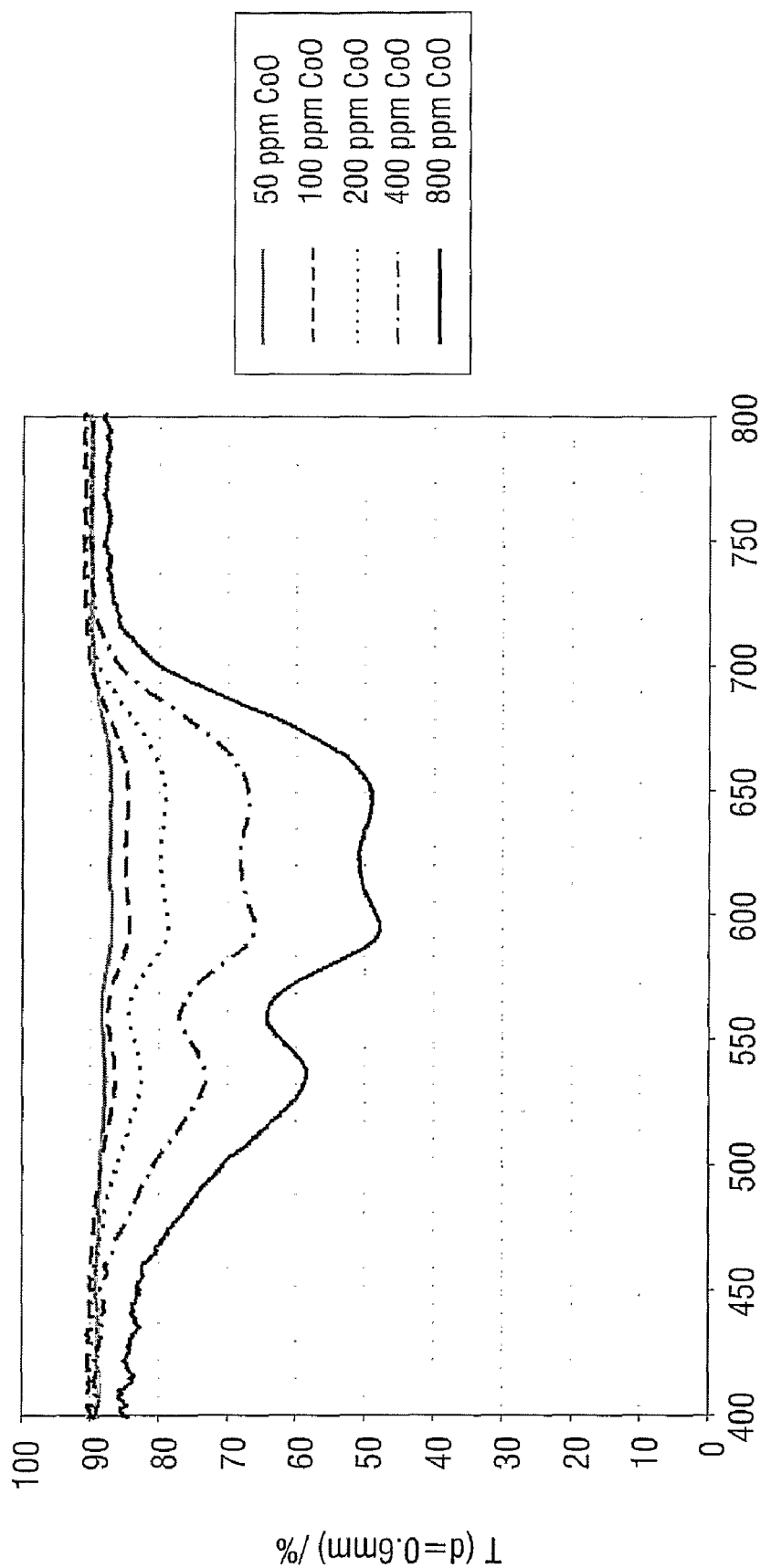
FIG. 1 shows light transmission curves in dependence of the wavelength of the light used.

FIG. 1 shows a graph of the transmission for a thickness of 0.6 mm in % against the wavelengths of the light used. It can be seen that at wavelengths between 600 and 650 nm the transmission equals approximately 50% for a glass including 800 ppm CoO and equals approximately 85% for a glass including 100 ppm CoO.

Figure 2:
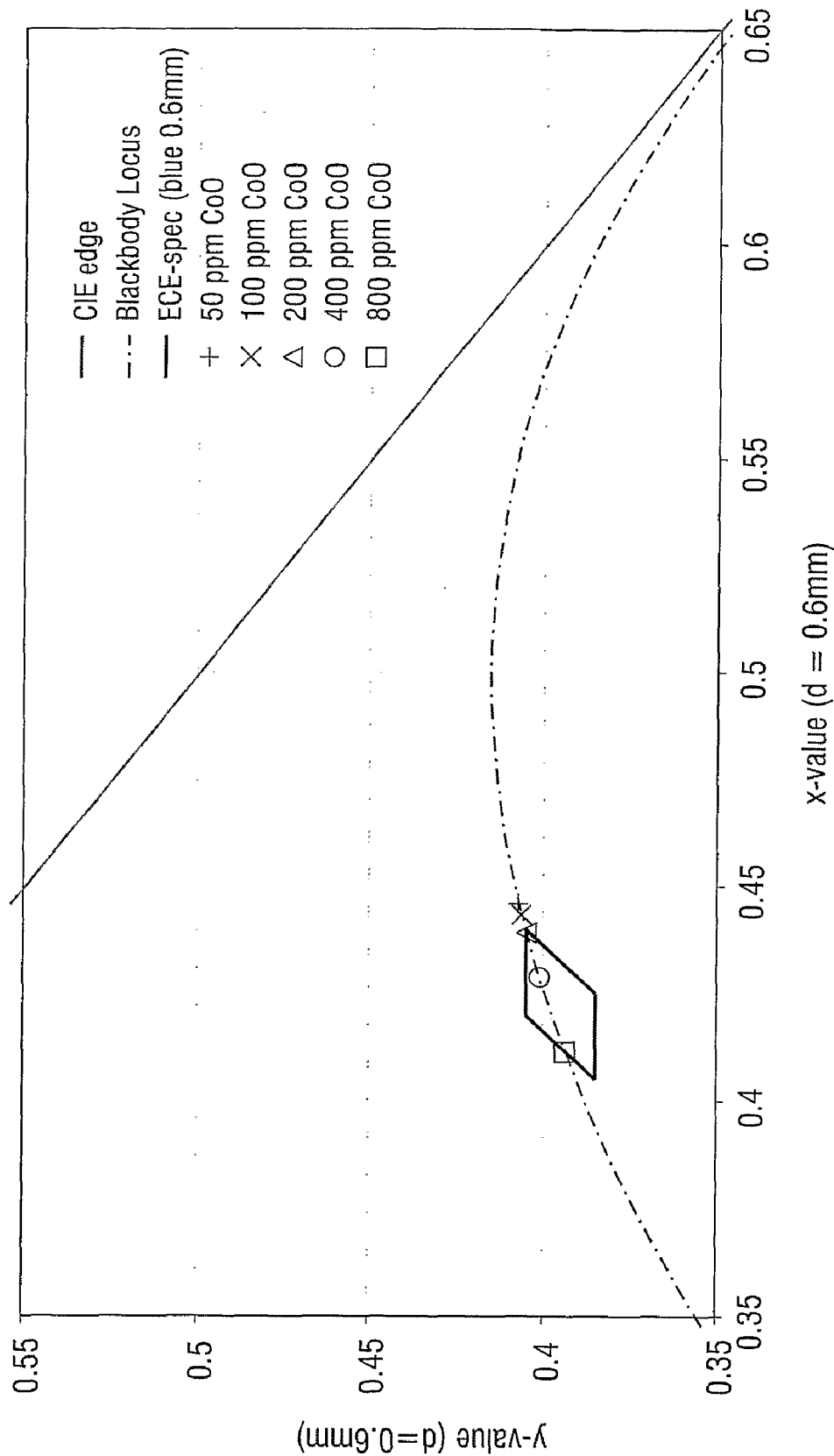
FIG. 2 shows a chromaticity diagram for glass according to the invention at a thickness of 0.6 mm.

FIG. 2 is a chromaticity diagram showing the Commission International de L'éclairage (CIE) edge as a straight line and furthermore the blackbody radiator locus, and an Economic Commission of Europe (ECE) specification (blue 0.6 mm) area is included, where it can be observed that several points on the black body locus, corresponding to the amount of cobalt oxide included in the glass, fall within said area. It can be seen in particular that x,y values for 200 tot 800 ppm CoO on the blackbody locus fall within the ECE specification.

The glass composition claimed in the present application has the desired characteristics of a blue glass which is usable, inter alia, for producing automotive signaling lamps which are in conformity with the ECE specification for blue glass at a thickness of 0.6 mm, said glass including cobalt oxide in addition to alkali metal oxides such as lithium oxide. Due to its composition, said glass can be produced at temperatures which are usual for alkali metal oxide glass, has a Tg below 500° C., and provides a brilliant blue color which so far could only be obtained with the use of lithium-free hard-glass materials.

The invention claimed is:

1. A glass composition for use in a lamp bulb and including cobalt oxide to provide a blue colored glass, wherein said composition comprises the following components in percents by weight (Wt%):

| Component | Wt % |
|---|---|
| $SiO_2$ | 60-75 |
| $Al_2O_3$ | 0.1-7 |
| $Li_2O$ | 0.1-2.5 |
| $Na_2O$ | 5-12 |
| $K_2O$ | 2-9 |
| MgO | 0.1-3 |
| CaO | 0.1-5 |
| SrO | 0.1-10 |
| BaO | 5-15 |
| $CeO_2$ | 0.10 ± 0.02 |
| CoO | 200-800 wt ppm. |

2. The glass composition according to claim 1, wherein said composition has a Tg below 700° C.

3. The glass composition according to claim 2, wherein said composition has a Tg below 500° C.

4. The glass composition according to claim 1, wherein said composition comprises:

| Component | Wt % |
|---|---|
| $SiO_2$ | 67.6 ± 0.5 |
| $Al_2O_3$ | 3.4 ± 0.2 |
| $Li_2O$ | 1.2 ± 0.1 |
| $Na_2O$ | 7.5 ± 0.3 |
| $K_2O$ | 4.9 ± 0.2 |
| MgO + CaO | 3.2 ± 0.2 |
| SrO | 3.0 ± 0.2 |
| BaO | 8.9 ± 0.2 |
| $CeO_2$ | 0.10 ± 0.02 |
| CoO | 200-400 wt ppm. |

5. The glass composition according to claim 4, wherein the composition has a $T_g$ of 470-480° C., a linear expansion coefficient (25° C. to $T_g$) of $10-11*10^{-6}$ °$C^{-1}$, and a density of $2.5-2.7*10^3$ kg/$m^3$.

6. The glass composition according to claim 4, wherein the composition has the following viscosity profile:
$10^{14.5}$ dPa·s at 455° C.
$10^{13.0}$ dPa·s at 485° C.
$10^{12.4}$ dPa·s at 500° C.
$10^{7.6}$ dPa·s at 675° C.
$10^{4.0}$ dPa·s at 1020° C.
$10^{2.0}$ dPa·s at 1490° C.

7. A glass bulb for an automotive lamp comprising the glass composition according to claim 1.

8. An automotive lamp emitting blue light during operationand including a glass bulb according to claim 7.

* * * * *